United States Patent [19]

Stone

[11] 4,048,552

[45] Sept. 13, 1977

[54] DIGITALLY REGULATED INVERTER

[75] Inventor: Dale Eugene Stone, Cedar Knolls, N.J.

[73] Assignee: Bell Telephone Laboratories, Incorporated, Murray Hill, N.J.

[21] Appl. No.: 657,353

[22] Filed: Feb. 12, 1976

[51] Int. Cl.² .......................................... H02M 3/335
[52] U.S. Cl. ..................................................... 363/25
[58] Field of Search ................................ 321/2, 11, 18

[56] References Cited

U.S. PATENT DOCUMENTS

| | | | |
|---|---|---|---|
| 3,821,632 | 6/1974 | Rylicki | 321/18 X |
| 3,852,656 | 12/1974 | Bourbeau | 321/11 |
| 3,873,903 | 3/1975 | Koetsch et al. | 321/18 X |

Primary Examiner—William M. Shoop
Attorney, Agent, or Firm—Robert O. Nimtz

[57] ABSTRACT

An inverter for direct current power generation is shown in which both voltage regulation and logical control of the output are achieved by digitally controlling the application of clock signals to the inverter circuit. A standard clock source is used to drive the inverter and digital circuitry, timed from the same clock source, is used to control the gating of clock pulses to the inverter. Entire clock pulses including both positive going and negative going transitions are blocked so as to preserve the balanced excitation of the inverter transformer. Logical control signals can also be used to disable the application of clock pulses.

5 Claims, 1 Drawing Figure

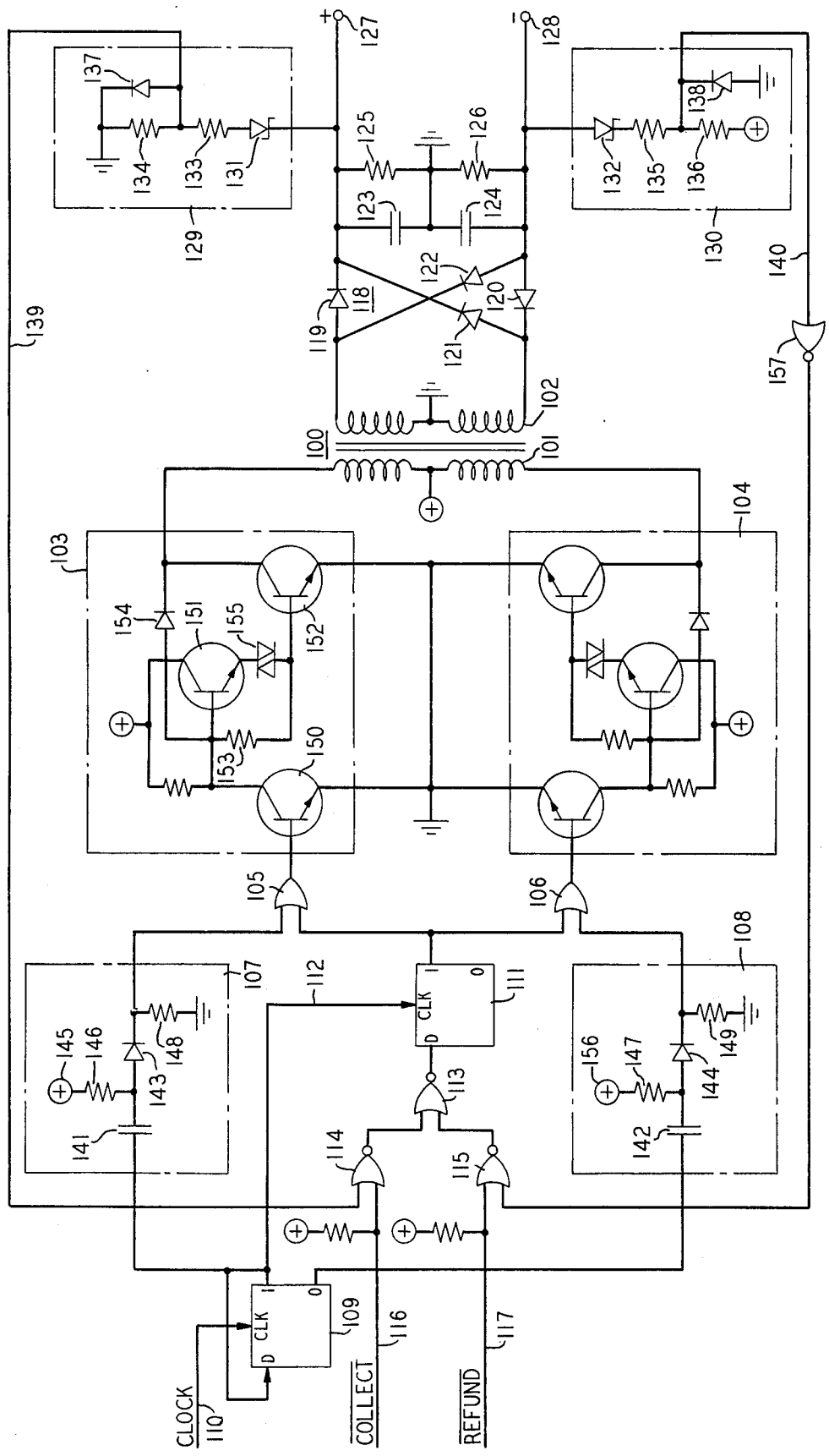

DIGITALLY REGULATED INVERTER

BACKGROUND OF THE INVENTION

2. Field of the Invention

This invention relates to digitally controlled inverter circuits and, more particularly, to the logical control of voltage generation at remote locations where centralized power supplies are not readily available.

2. Description of the Prior Art

In many telephone applications it is necessary to provide certain direct current control voltages to operate equipment located at a station set. Coin stations, for example, require both positive and negative sources of 100 volts to operate coin collect and coin return relays at the coin station.

If it is desired to service such coin stations through subscriber loop multiplex systems such as that disclosed in the copending application of J. E. Dail Ser. No. 645,022 filed Dec. 29, 1975 and assigned to applicant's assignee, these voltages cannot be supplied directly from the central office. It is therefore desirable to generate direct current control voltages at the remote locations which are under the control of supervisory information from the central office. Such voltage supplies must be small, compact, and inexpensive, as well as efficient and reliable.

In order to regulate the output of a power supply of this type, it has been common in the art to provide regulation by controlling the width or duty cycle of the driving signal. This regulating arrangement has the disadvantage that the portion of conversion inefficiency resulting from switching losses is not directly proportional to output power. The fractional loss of power due to switching losses increases with decreasing output power. A further disadvantage is the often necessary requirement that the duty cycle of the two bipolar driving signals be carefully matched or controlled to avoid applying a direct current offset voltage to the inverter transformer with the possibility of saturating the transformer's magnetic core.

SUMMARY OF THE INVENTION

In accordance with the illustrative embodiment of the present invention, a regulated direct current supply voltage is generated by an inverter circuit which is driven by a regularly-recurring clock pulse source. Regulation is accomplished by utilizing digital logic circuits to block complete bipolar pairs of clock pulses at the input to the inverter. Since the inverter output is thus controlled at low signal levels, standard low-level digital logic circuits suffice to accomplish this control and at the same time increase the efficiency of the inverter circuit. Moreover, these same digital logic circuits can be used to inhibit the generation of the inverter output altogether. This low-level blocking permits the generation of the output voltage only during those periods which actually require such voltages. Finally, by blocking successive alternate phases of the clock signal, the balanced drive to the inverter circuit is preserved and the likelihood of saturating the inverter transformer is minimized. Switching losses, moreover, are directly proportional to output power and essentially independent of output current.

BRIEF DESCRIPTION OF THE DRAWING

The single FIGURE of the drawing is a detailed circuit diagram of a digitally controlled inverter circuit illustrating the arrangements of the present invention.

DETAILED DESCRIPTION OF THE DRAWING

In the drawing, an inverter circuit comprises a transformer 100 having a center-tapped primary winding 101 and a center-tapped secondary winding 102. A pair of transistorized driver circuits 103 and 104 are utilized to alternately drive the upper and lower half windings of primary winding 101. Drivers 103 and 104, to be described in detail hereafter, are themselves driven by the outputs of logical OR gates 105 and 106, respectively. One input to each of OR gates 105 and 106 it taken from pulse shaping circuits 107 and 108, respectively. Pulse shapers 107 and 108 serve the dual function of providing standard shaping to the pulses applied to gates 105 and 106 and further of insuring that the steady state input to these logical gates is a high voltage corresponding to a logical ONE when the driving signal from flip-flop 111 is lost. This provides fail-safe operation by which the inverter circuit is disabled in the absence of a driving clock signal.

The inputs to pulse shapers 107 and 108 are taken from the 1 and 0 outputs of a standard D-type flip-flop circuit 109. Flip-flop 109 is driven from a clock pulse source by clock signals on lead 110.

The remaining inputs to OR gates 105 and 106 are taken from the 1 output of D-type flip-flop 111. Flip-flop 111 is under the control of clock timing signals on lead 112 from the 1 output of flip-flop 109 and logical control signals from logical NOR gate 113. NOR gate 113, in turn, is driven by the outputs of NOR gates 114 and 115.

One input to NOR gate 114 is a binary signal on lead 116 indicating the logical need for an output voltage of a positive polarity (coin "collect" in the illustrative embodiment). Lead 116 is labeled "Collect" and indicates that a +100 volt signal is required to perform a coin collect function in a standard telephone pay station when the lead goes low.

Similarly, a binary signal on lead 117 is applied to NOR gate 115 and indicates the logical necessity for a negative output potential. In the illustrative embodiment, lead 117 has been labeled "Refund", indicating the need for a negative 100 volts to perform the coin refund function in a standard telephone pay station when lead 117 goes low. These logical functions are merely illustrative of any other logical functions defining the need for regulated output voltages from the inverter of the drawing.

The secondary winding 102 of transformer 100 is connected through a full wave rectifier 118 consisting of rectifying diodes 119, 120, 121, and 122. The output of rectifier 118 is filtered by capacitors 123 and 124, dividing the output across rectifier 118 into a positive and a negative voltage with respect to ground potential. Bleeder resistors 125 and 126 are also connected across these voltage outputs. The resulting positive voltage appears on terminal 127 and the negative voltage appears on terminal 128.

In order to regulate the magnitude of the output voltages at terminals 127 and 128, a pair of voltage comparison circuits 129 and 130 are provided to compare the voltages at terminals 127 and 128 with standard voltage drops across zener diodes 131 and 132. A voltage divider comprising resistors 133 and 134 is connected in series with zener diode 131 between terminal 127 and ground potential. Similarly, a voltage divider comprising resistors 135 and 136 is connected in series with zener diode 132 between terminal 128 and a source of positive potential. Diode 137 is connected across resistor 134 while diode 138 is connected across resistor 136.

Whenever the rectified output current delivered by rectifier 118 is larger than the output current drawn by the load connected to terminals 127 or 128, the voltage across the appropriate filter capacitor is increasing. At some preselected zener breakdown level, zener diode 131 or 132 breaks down to provide a control voltage across the corresponding voltage divider. Diode 131 breaking down directly biases lead 139 positive while diode 137 limits the level of positive voltage on lead 139 to prevent gate 114 from being damaged. Diode 132 breaking down biases lead 140 negative while diode 138 limits the magnitude of the negative voltage to prevent damaging gate 157. The negative voltage on lead 140 is applied to NOR gate 157 and thus results in a positive voltage to gate 115. Thus when each supply is above the design limit, a positive voltage is applied to the appropriate one of NOR gates 114 and 115 to discontinue excitation of the inverter.

When the load on either terminal 127 or 128 exceeds the current supplied by rectifier 118, the appropriate capacitor 123, or 124, is discharging. When the voltage across either falls below the design limit, the corresponding zener diode stops conducting and the voltage lead on the corresponding lead 139 or 140 goes low. Since there is no output from rectifier 118 without driving signals from OR gates 105 and 106, regulation can be accomplished by enabling gates 105 and 106 only as long as the output voltage at terminal 127 or 128 is below the design level required for system operation. If these voltages are above the design limit or not required, the outputs from gates 114 and 115 will both be low, causing a high input to flip-flop 111 through gate 113. Gates 105 and 106 are therefore both held enabled and cannot be pulsed again until the output voltage falls below the design value.

Since the flip-flop 111 is timed by the clock signal on lead 112, the enablement and disablement of gates 105 and 106 are synchronized with trailing edges of the clock pulses and at least one full cycle of clock pulses are blocked. Additional cycles will be blocked as long as the output voltage(s) remains above the desired values. If either supply is required and not already at or above design level, the convertor is activated. The other supply remains well regulated even when unloaded because the regulated supply effectively limits the other regulator output voltage through the coupling of the transformer.

Pulse shapers 107 and 108 comprise coupling capacitors 141 and 142 connected in series with diodes 143 and 144, respectively, to the inputs of OR gates 105 and 106. Diodes 143 and 144 can be forward biased by voltage supply 145 operating through resistors 146, 147, 148, and 149. The forward biased diodes cause logical highs to be presented to gates 105 and 106. Negative transitions on the outputs of flip-flop 109 are coupled through capacitors 141 and 142 to reverse bias diodes 143 and 144 and cause low inputs to OR gates 105 and 106. If for some reason, however, clock pulses fail to appear or flip-flop 109 gets stuck in one state, the capacitors 141 and 142 will eventually charge sufficiently to forward bias the associated diodes and force high inputs to gates 105 and 106. In this way, the drive circuit for the inverter is a failsafe device in that the inverter is fully inhibited in the absence of driving signals.

The driver circuits 103 and 104 are identical and hence only driver circuit 103 will be described in detail. An input transistor 150 is driven by OR gate 105 and, in turn, drives transistor 151. Transistor 151, in turn, is connected as an emitter follower to drive power transistor 152. Resistor 153 provides the path for discharging the emitter-base capacitance of transistors 151 and 152. Diode 154 speeds up the operation of the driver circuit by preventing saturation of transistor 152. When the output transistor 152 is ON and its collector voltage drops to the forward voltage drop of voltage diode 154 below the voltage at the base of transistor 151, diode 154 conducts to bleed excess base drive from transistor 151 and thus from output transistor 152. The output voltage is therefore clamped at the sum of the voltage drops across the base-emitter path of transistor 151, the base-emitter drop of transistor 152 and the drop across varistor 155, less the voltage drop across diode 154.

In operation, drivers 103 and 104 are alternately energized by gates 105 and 106, respectively, to draw a square pulse of current through the upper and lower half windings of the input winding 101 of transformer 100. Higher voltages are produced across the secondary winding 102 of transformer 100 which higher voltages are rectified by rectifier 118 to provide the output voltages.

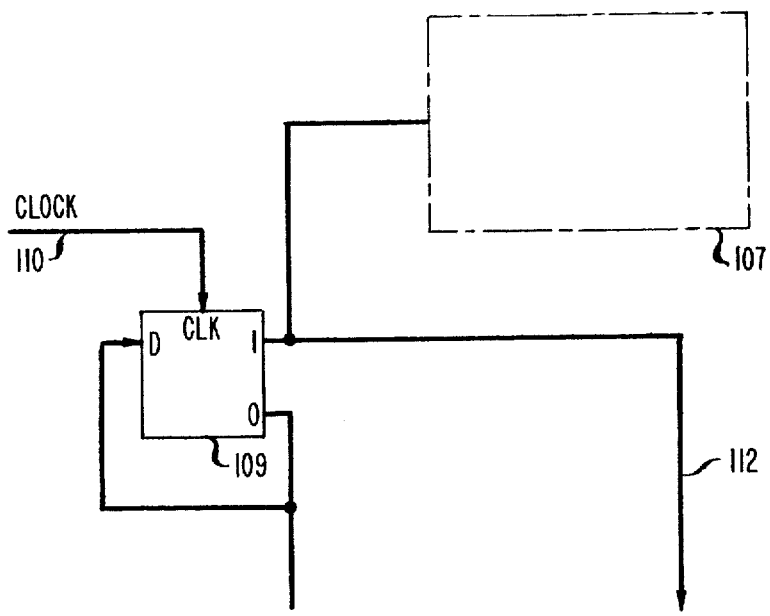

What is claimed is:
1. A digitally-controlled inverter comprising:
   a source of clock pulses,
   a transformer responsive to said clock pulses,
   a rectifier connected to the output of said transformer,
   means for inhibiting only one or more successive full cycles of said clock pulses, and
   means responsive to the output of said rectifier for controlling said inhibiting means.
2. The digitally-controlled inverter according to claim 1 wherein said controlling means includes binary logic circuits, and
   a source of binary control signals to control said logic circuits.
3. The digitally-controlled inverter according to claim 1 wherein said controlling means includes
   an analog comparison circuit for comparing said output of said rectifier with a reference voltage, and
   means for generating a binary control signal in response to said comparison circuit.
4. The digitally-controlled inverter according to claim 1 wherein said source of clock pulses includes
   means responsive to the loss of pulses from said source for blocking the operation of said inverter.
5. A regulated inverter comprising:
   a clock pulse source,
   a transformer responsive to said clock pulse source,
   a rectifier connected to the output of said transformer,
   a source of reference voltage,
   a comparator for comparing said reference voltage and the output of said rectifier, and
   means responsive to said comparator for blocking entire clock pulses from said source.

* * * * *

UNITED STATES PATENT AND TRADEMARK OFFICE
CERTIFICATE OF CORRECTION

PATENT NO. : 4,048,552

DATED : September 13, 1977

INVENTOR(S) : Dale E. Stone

It is certified that error appears in the above-identified patent and that said Letters Patent are hereby corrected as shown below:

In the drawing located on the Abstract page and the page immediately following, the "D" input to flip-flop 109 should be connected to the "0" output of flip-flop 109 (rather than to the "1" output as shown in the original patent drawing). A corrected drawing is shown on the attached sheet.

Signed and Sealed this

*Eighteenth* Day of *September 1979*

[SEAL]

*Attest:*

LUTRELLE F. PARKER

*Attesting Officer*     Acting Commissioner of Patents and Trademarks

UNITED STATES PATENT AND TRADEMARK OFFICE
CERTIFICATE OF CORRECTION

PATENT NO. : 4,048,552  
DATED : September 13, 1977  
INVENTOR(S) : Dale E. Stone Page 2 of 2

It is certified that error appears in the above-identified patent and that said Letters Patent are hereby corrected as shown below: